United States Patent
Lerman (10) Patent No.: US 9,870,220 B2
(45) Date of Patent: Jan. 16, 2018

(54) MEMORY FLASH APPARATUS AND METHOD FOR PROVIDING DEVICE UPGRADES OVER A STANDARD INTERFACE

(75) Inventor: Mikhael Lerman, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 262 days.

(21) Appl. No.: 12/329,501

(22) Filed: Dec. 5, 2008

(65) Prior Publication Data

US 2010/0146159 A1    Jun. 10, 2010

(51) Int. Cl.
*G06F 9/445* (2006.01)

(52) U.S. Cl.
CPC .................... *G06F 8/665* (2013.01)

(58) Field of Classification Search
None
See application file for complete search history.

(56) References Cited

U.S. PATENT DOCUMENTS

| | | | |
|---|---|---|---|
| 5,210,749 A * | 5/1993 | Firoozmand | 370/463 |
| 5,644,594 A * | 7/1997 | Johnson | G06F 8/65 375/222 |
| 6,094,063 A * | 7/2000 | St. Pierre et al. | 326/37 |
| 6,182,203 B1 * | 1/2001 | Simar et al. | 712/22 |
| 7,246,217 B1 * | 7/2007 | Tomkins et al. | 712/28 |
| 7,272,706 B2 | 9/2007 | Ben Ismail et al. | |
| 7,788,699 B2 * | 8/2010 | Largman et al. | 726/1 |
| 8,214,653 B1 * | 7/2012 | Marr et al. | 713/189 |
| 2002/0152428 A1 * | 10/2002 | James et al. | 714/42 |
| 2003/0140291 A1 * | 7/2003 | Brown et al. | 714/724 |
| 2003/0191623 A1 * | 10/2003 | Salmonsen | 703/24 |
| 2003/0225955 A1 * | 12/2003 | Feldstein et al. | 710/306 |
| 2003/0229796 A1 * | 12/2003 | Shih | 713/193 |
| 2004/0088534 A1 * | 5/2004 | Smith et al. | 713/1 |
| 2004/0133771 A1 * | 7/2004 | King et al. | 713/100 |
| 2004/0202325 A1 * | 10/2004 | Margalit et al. | 380/247 |

(Continued)

OTHER PUBLICATIONS

Fone Fun SHOP.co.uk, Web Page: Unlocking/Flashing Products, Scout Dongle Description, Oct. 2, 2008, p. 1.

(Continued)

*Primary Examiner* — Henry Tsai
*Assistant Examiner* — Christopher Bartels
(74) *Attorney, Agent, or Firm* — Faegre Baker Daniels LLP (57) ABSTRACT

An electronic device includes routing logic operatively coupled to a communication port that is externally accessible so that there is no need to disassemble the electronic device to gain access. The port may be a USB (universal serial bus) port and provides access to an internal bus. The routing logic is also operatively coupled to a memory subsystem such that it may route data from an external device, connected at the port, to the memory subsystem to modify or replace a boot code, including a BIOS code. A memory interface device includes an interface module, a memory interface module for communicating with a memory subsystem including a boot PROM (programmable read only memory), and a routing logic coupled to the interface module and the memory interface module. The routing logic routes data from the external device to the boot PROM, so that a boot code, including a BIOS (basic input/output system), may be modified or replaced.

23 Claims, 5 Drawing Sheets

(56) References Cited

U.S. PATENT DOCUMENTS

| | | | |
|---|---|---|---|
| 2004/0268116 A1* | 12/2004 | Vasisht et al. | 713/100 |
| 2005/0109841 A1* | 5/2005 | Ryan et al. | 235/380 |
| 2005/0120146 A1* | 6/2005 | Chen et al. | 710/22 |
| 2005/0132116 A1* | 6/2005 | Gillet | 710/307 |
| 2006/0048146 A1* | 3/2006 | Oh | G06F 11/1433 717/178 |
| 2006/0107328 A1* | 5/2006 | Frank | G06F 21/10 726/26 |
| 2006/0265607 A1* | 11/2006 | Liang | 713/300 |
| 2007/0136570 A1* | 6/2007 | Frank et al. | 713/2 |
| 2007/0277028 A1* | 11/2007 | Cates et al. | 713/2 |
| 2008/0059679 A1* | 3/2008 | Zhang et al. | 710/301 |
| 2008/0147962 A1* | 6/2008 | Diggs et al. | 711/103 |
| 2008/0276302 A1* | 11/2008 | Touboul | 726/3 |
| 2009/0132735 A1* | 5/2009 | Gelberg et al. | 710/52 |
| 2009/0307545 A1* | 12/2009 | Van Splunter et al. | 714/726 |
| 2010/0081375 A1* | 4/2010 | Rosenblatt | G08C 17/02 455/41.1 |

OTHER PUBLICATIONS

Fone Fun SHOP.co.uk, Web Page: Unlocking/Flashing Products, Rocker Dongle Description, Oct. 2, 2008, pp. 1-2.

\* cited by examiner

FIG. 1

- PRIOR ART -

FIG. 2

- PRIOR ART -

MEMORY FLASH APPARATUS AND METHOD FOR PROVIDING DEVICE UPGRADES OVER A STANDARD INTERFACE

FIELD OF THE DISCLOSURE

The present disclosure is related to non-volatile memory and methods and apparatuses for upgraded code stored on such non-volatile memory, including boot code or BIOS code.

BACKGROUND

All computers and many electronic devices include non-volatile memory for storing a boot code also sometimes referred to as the BIOS (i.e., basic input/output system). The boot code or BIOS enables the device to "boot," setting up basic processes so that the device may, among other things, interact with various peripherals such as a keyboard, etc. Early versions of non-volatile memory included one-time-programmable (OTP) ROM, which was eventually replaced by EPROM (Erasable Programmable Read Only Memory). EPROM memory required exposure to ultra-violet light in order to erase the "burned-in" code and render it programmable. Today, EPROM has been superceded by EEPROM (Electrically Erasable Programmable Read Only Memory), which includes the recent "flash" memory included in many electronic devices and also in memory sticks useful for storing personal data.

Figure 1:
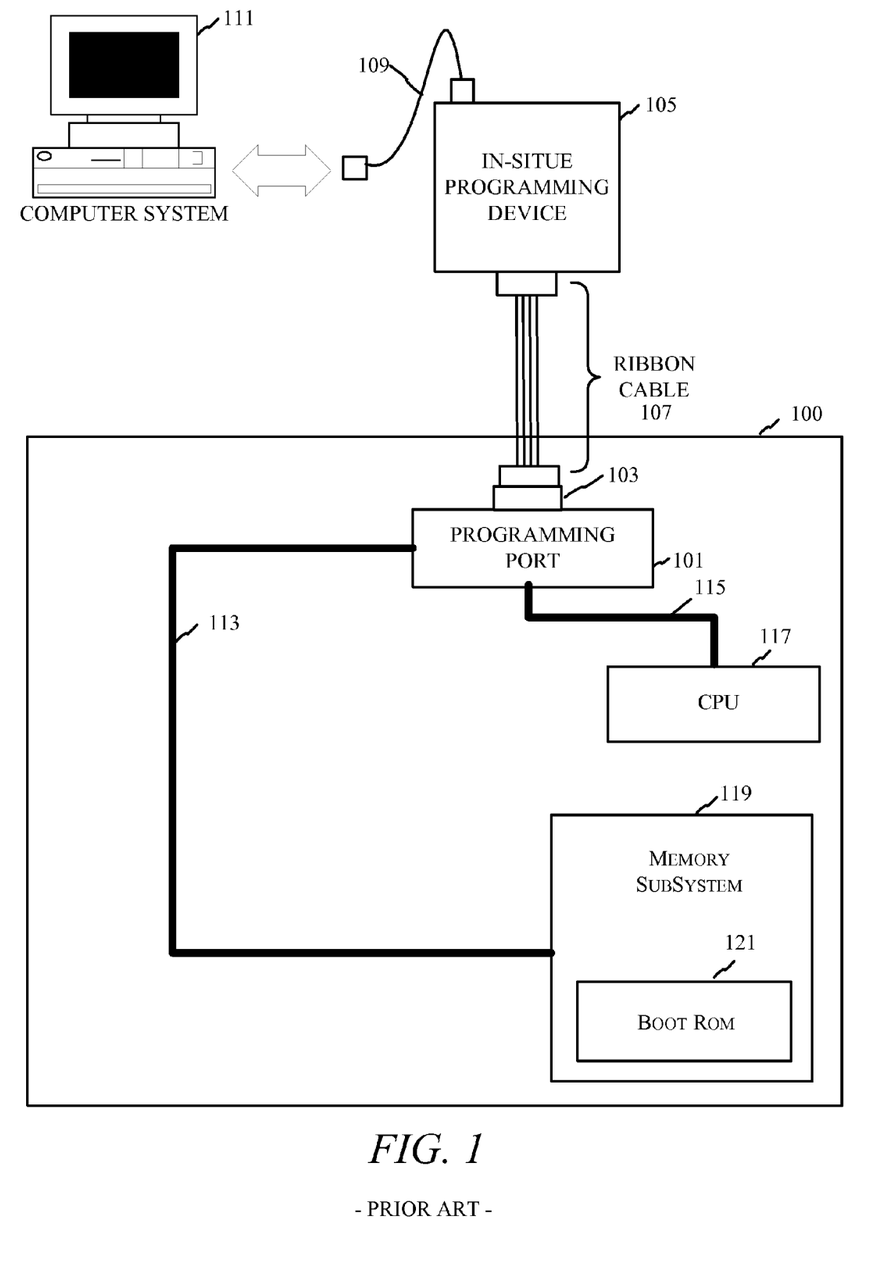
FIG. 1 is a block diagram of an in-situe programming device connected to a programming port of a circuit board, for providing a programming upgrade to a boot ROM.

Flash memory allowed for upgrading software by performing a flash operation on the memory as illustrated in the example of FIG. 1. FIG. 1 shows a circuit board 100 that includes a programming port 101 and a programming connector 103. The programming connector 103 is provided to connect an external cable, such as ribbon cable 107, directly to the circuit board 100 such that an "in-situe" programming device 105 may be interfaced. The in-situe programming device 105 may also include a separate cable 109 for connection to a computer system 111, or other device, related to the programming operation.

In some configurations, a special clamp connector is used that allows connection directly to the boot ROM 121 pins. For configurations such as that exemplified in FIG. 1, the programming port is connected, via internal routing 113, to the memory subsystem 119 and the boot ROM 121. Other connections may also be present, such as routing connection 115 enabling interface with the Central Processing Unit (CPU) 117. Via the connections illustrated in FIG. 1, the in-situe programming device 105 may reprogram, or "flash," the boot ROM 121 with a new or upgraded boot code or BIOS code.

Figure 2:
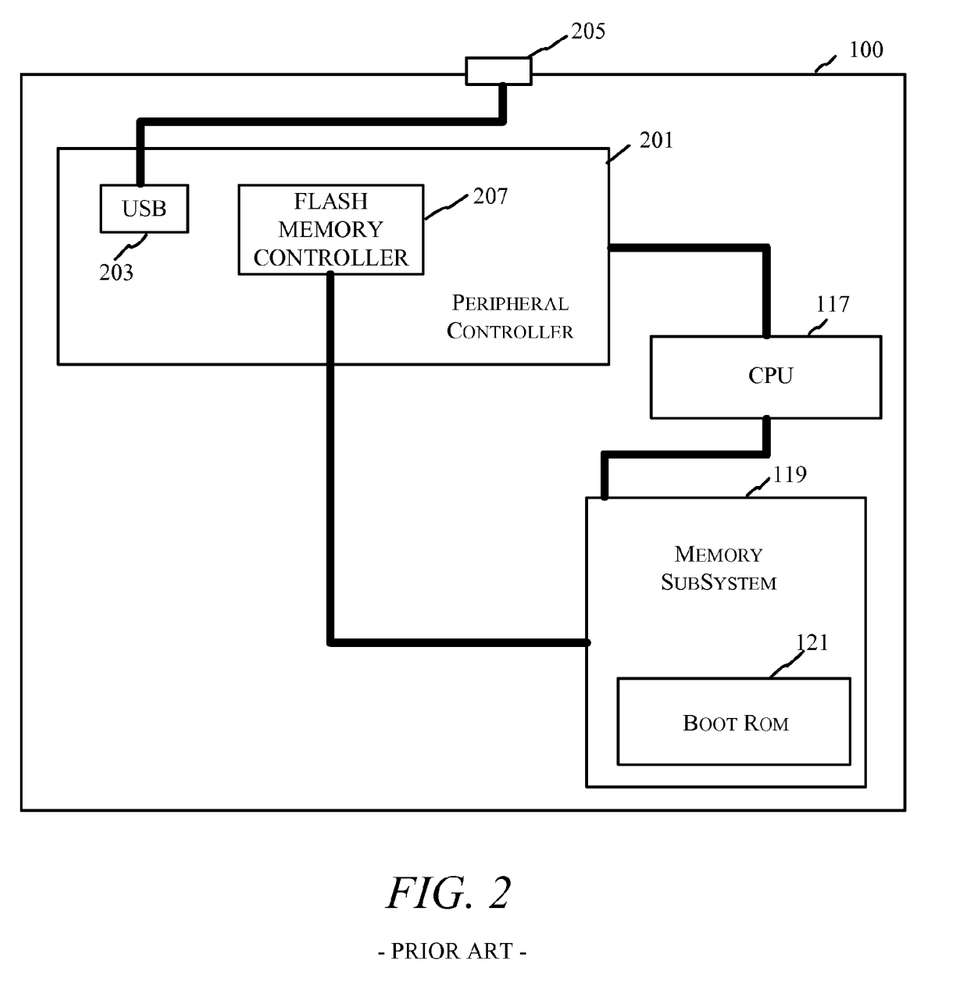
FIG. 2 is a block diagram showing a peripheral controller in a circuit board having a flash memory controller for controlling a boot ROM.

The circuit board 100 may include a peripheral controller 201 as shown in FIG. 2. The peripheral controller usually includes support for various interfaces and devices, and usually includes a flash memory controller 207 for interfacing with the boot ROM 121 of the memory subsystem 119. Various other support may be present in the peripheral controller 201, such as, for example, Universal Serial Bus (USB) logic 203. The USB logic 203 supports one or more USB connectors 205 which allow access to various components of the circuit board 100 in addition to the memory subsystem 119 and the CPU 117. The peripheral controller 201 may include the programming port 101, however, as discussed above, the boot ROM 121 may also be accessed by a clamp connector that connects directly to the pins of the boot ROM package.

Universal Serial Bus (USB) devices exist that may be connected to an electronic device such as a mobile telephone, and that may be used for "unlocking" the mobile phone. Unlocking involves changing a numeric network identifier that is hidden within application layer software in order to allow the mobile telephone access to various networks. Therefore, while these USB devices may also allow changing software at the application level, they do not provide serial programmer functionality as does an in-situe programming device 105 as illustrated in FIG. 1.

As computing devices have become smaller and more integrated in terms of components, access to the boot ROM, and any internal circuit boards containing the boot ROM, has become difficult or even impossible without complete disassembly of the device. This therefore makes upgrading the BIOS, or any other software contained in non-volatile memory, difficult as well.

Therefore a need exists for upgrade apparatuses and methods that do not require specialized connectors, and that do not require direct access to a circuit board where a device must be opened or disassembled.

DETAILED DESCRIPTION

The present disclosure provides an electronic device including routing logic that is operatively coupled to a communication port of an electronic device, where the communication port is externally accessible such that there is no need to disassemble the electronic device to gain access to internal components. The communication port, which may be a USB or other suitable port, provides access to an internal bus of the electronic device. The routing logic is also operatively coupled to a memory subsystem such that it is operative to route data from an external device, connected at the communication port, to the memory subsystem for the purpose of modifying or replacing a boot code. The boot code may be a Basic Input/Output System (BIOS) code.

The present disclosure also provides a memory interface device including an interface module having a communication port, such as a USB port, for communicating with an external device. The memory interface device also includes a memory interface module for communicating with a memory subsystem including a boot Programmable Read Only Memory (PROM), and a routing logic coupled to the interface module and the memory interface module. The routing logic is operative to route data from the external device to the boot PROM, so that a boot code stored on the boot PROM may be modified or replaced. The boot code may be a Basic Input/Output System (BIOS) code.

A method is also provided and includes detecting a device at a communication port of an electronic device; detecting, by a routing logic, that an external device, connected at the communication port is a PROM programming device; and routing data from the external device, to a memory subsystem for modifying or replacing a boot code stored within the memory subsystem. The method may include modifying or replacing a boot code, such as a BIOS, stored within the memory subsystem.

The present disclosure further provides a computer readable memory, that includes executable instructions for execution by at least one processor, that when executed cause a platform to detect an external device at an interface port of an electronic device and that it is a PROM programming device, and route data from the external device, to a memory subsystem for the purpose of modifying or replacing a boot code, such as a BIOS, stored within the memory subsystem.

Figure 3:
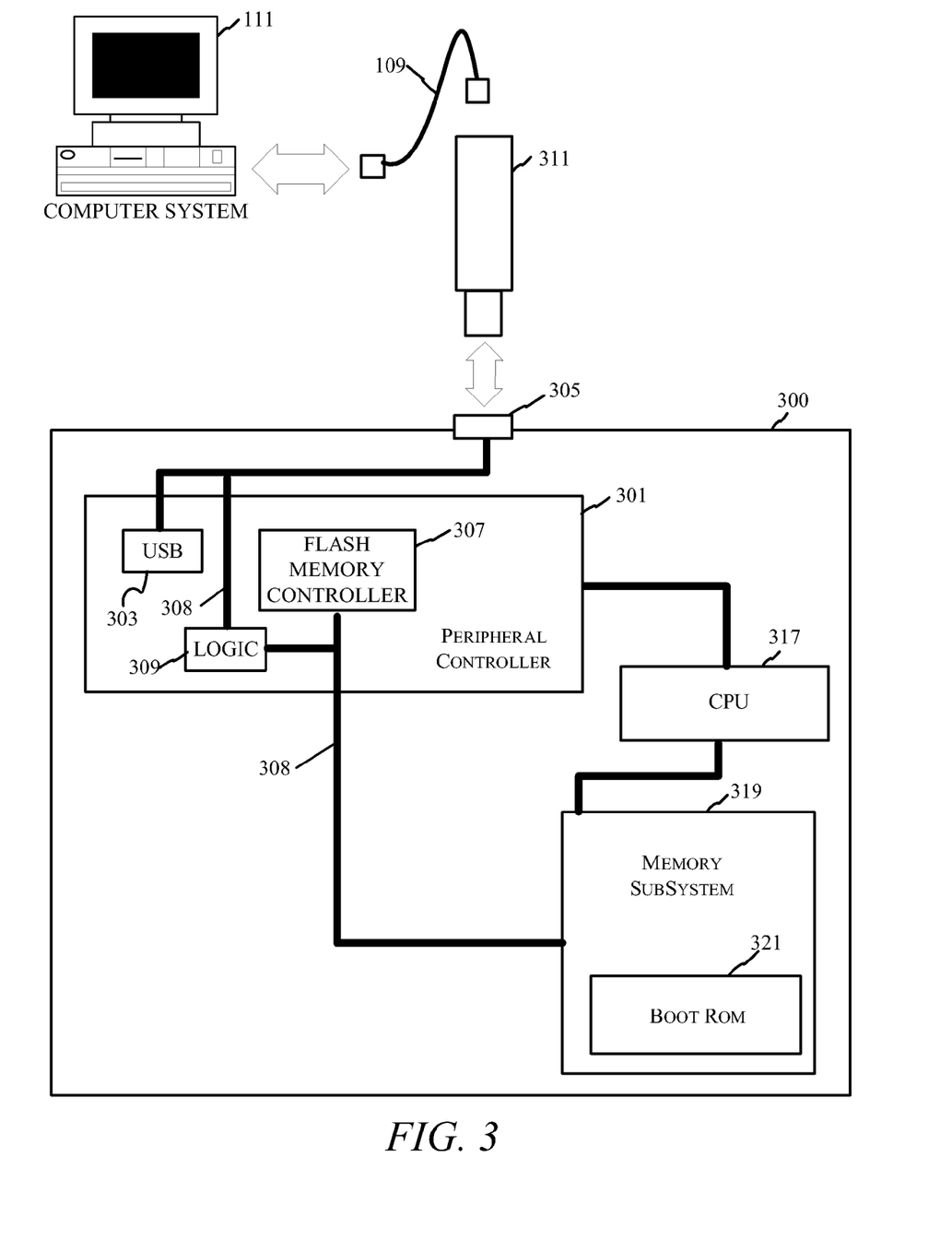
FIG. 3 is a block diagram of a programming device and circuit board in accordance with the embodiments.

Turning now to the drawings wherein like numerals represent like components, FIG. 3 illustrates a circuit board 300 in accordance with the embodiments. The circuit board 300 includes a standard connector 305 which enables communication with devices external to an electronic device which houses the circuit board 300. For the example provided in FIG. 3, connector 305 is a Universal Serial Bus (USB) connector, however, any suitable connector could be used in the embodiments, such as, but not limited to, SCSI, IEEE 1394, etc. The circuit board 300 includes an peripheral controller 301, which includes support for the connector 305 interface, which in the example provided, includes USB logic 303. The peripheral controller 301 also includes other support, such as, but not limited to, flash memory controller 307. The electronic device housing the circuit board 300 may be any electronic device that has a BIOS such as, but not limited to, a laptop computer, a mobile telephone, an electronic gaming device, an electronic book reader, a personal digital assistant (PDA), etc.

The peripheral controller 301 may be operatively coupled to various components throughout the circuit board 300 and the electronic device housing the circuit board 300. That is, internal data buses and, in some cases, other intermediary components, enable the peripheral controller 301 to, directly or indirectly, access components within the circuit board 300 such as, memory subsystem 319, which includes boot ROM 321, and CPU 317.

It is to be understood that FIG. 3, and the other figures provided in the present disclosure, are for illustrative purposes only. The purpose of the illustrations is to explain to one of ordinary skill in the art how to make and use the herein disclosed embodiments. Therefore the figures are limited to showing and describing the elements necessary to facilitate an understanding, by one of ordinary skill in the art, of how to make and use the described embodiments. Therefore the various figures, such as FIG. 3, are not intended to be complete schematic representations of the various components and devices illustrated, but, rather, are intended to illustrate the components of the various embodiments and the interrelation and connections of those components to other components of the device. For example, the connector 305 may be located with respect to an electronic device housing, such that the connector 305 may be accessible from outside of the electronic device, without the need to disassemble the electronic device to access the circuit board 300. In other words, the connector 305 may be an electronic device connector, such as, but not limited to, a USB connector, mini-USB connector, IEEE 1394 connector, etc., that enables external peripheral devices to be connected to the electronic device housing the circuit board 300.

Further for illustrative purposes, the memory subsystem 319 is shown as including the boot ROM 321, which contains a boot code or the BIOS, and that the boot ROM is accessed via the memory subsystem 319. However, the boot ROM 321 may be directly accessed in the embodiments, by way of, for example USB access or other suitable access in accordance with the embodiments. Therefore, various arrangements of internal components and corresponding connectivity may be utilized and such arrangements and corresponding connectivity would remain in accordance with the embodiments herein disclosed.

The term "logic" as used herein includes software and/or firmware executing on one or more programmable processors, ASICs, DSPs, hardwired logic or combinations thereof. Therefore, in accordance with the embodiments, the USB logic, routing logic, etc., may be implemented in any appropriate fashion and would remain in accordance with the embodiments herein disclosed.

The peripheral controller 301 may access the CPU 317 to perform functions, such as a reset, to cause a reboot of the electronic device after updating a boot code or BIOS as will be discussed. The reset may be held persistent for the time required to update the boot ROM 321, and subsequently released such that the CPU 317 reboots using a new boot code or BIOS.

A programming device 311, in accordance with the embodiments, utilizes a connector, such as a USB connector similar to that used by a USB memory stick. The programming device may include other connections, such as cable 109, to connect to a computer system 111, similar to the in-situe programming device 105 shown in FIG. 1. However, the programming device 311 of the embodiments may be a stand alone programming device and may perform upgrades to the boot ROM 321 without being connected to an other device, such as computer system 111. Various designs of the programming device 311 are possible and would remain in accordance with the embodiments wherein the programming device 311 accesses the boot ROM 321 using a standard interface and connection, such as, for example, USB. The programming device 105 may, in some embodiments, operate only as a programming device. For example, the programming device 105 may act only to send commands, and may also receive acknowledgements, in order to cause an upgrade or replacement of a boot code or BIOS, where the upgrade or replacement boot code or BIOS is retrieved from another location, for example, from the computer system 111 connected to the programming device 105, or from some other device connected to the electronic device which houses the circuit board 300. However, in other embodiments, the programming device 105 may also include storage for storing the upgrade or replacement boot code or BIOS.

In accordance with the embodiments, the peripheral controller 301 includes a routing logic 309 which is operatively coupled, via connection 308, to the USB logic 303 and the flash memory controller 307, and appropriately routes upgrade data from the programming device 311 to the boot ROM 321. The term "data" as used herein includes commands and/or acknowledgements between the programming device 311 and electronic device, and also includes the BIOS upgrades that may be serial information sent from the programming device 311 to the memory subsystem 319. Therefore, in accordance with the embodiments, the programming device 311 may be connected to a USB connector 305 and perform a flash operation on the boot ROM 321 so as to upgrade or replace an existing boot code or BIOS. In other words, the routing logic 309 takes control of the USB lines and configures them into a ROM programming path which may be used by a serial ROM programming device, for example, programming device 311.

Figure 4:
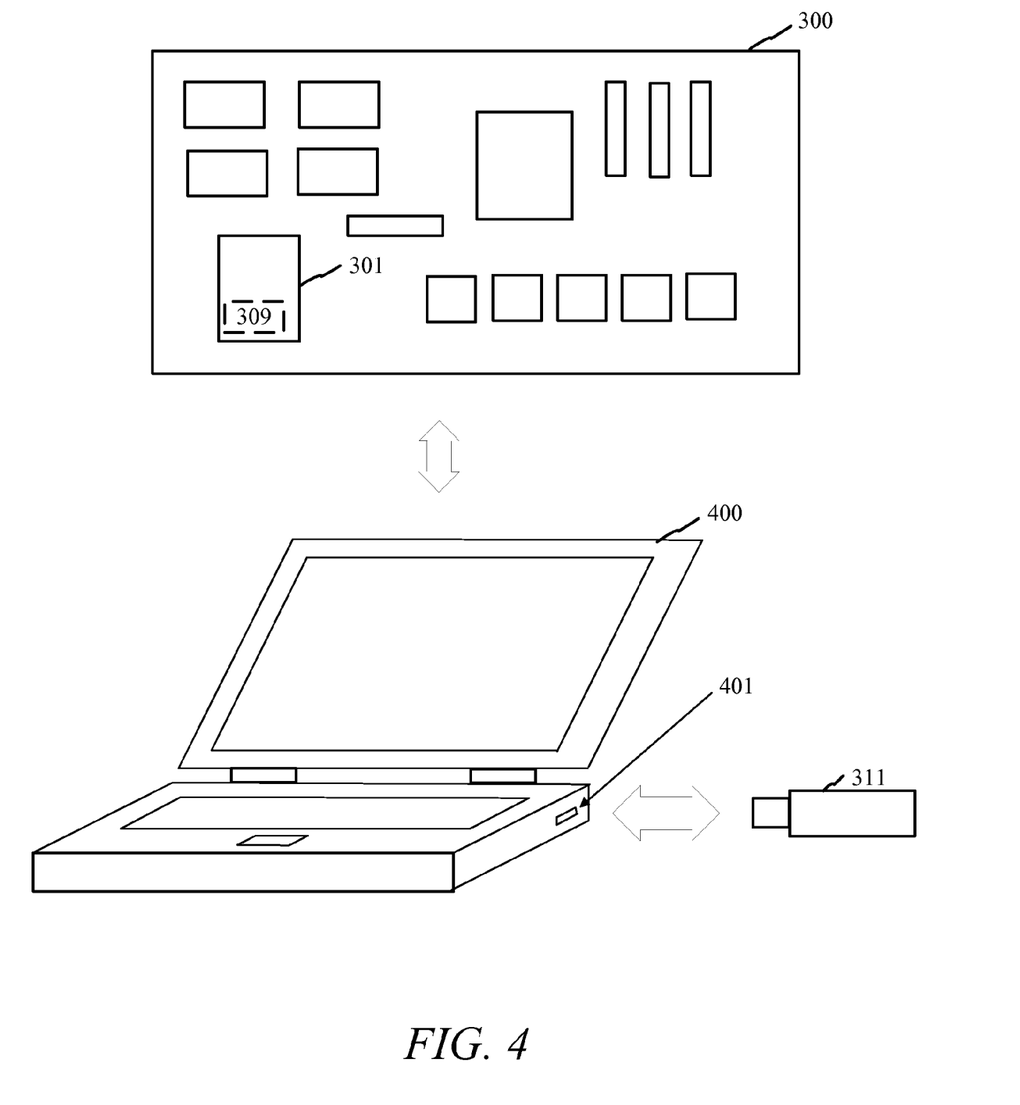
FIG. 4 is a diagram of a laptop computer having an internal circuit board and an external programming device in accordance with the embodiments.

FIG. 4 illustrates a scenario wherein the programming device 311 may upgrade the boot ROM of a laptop computer 400. The laptop computer 400 includes a USB connector 401 which allows the programming device 311 to connect. The laptop computer 400 includes the circuit board 300 which has a peripheral controller 301 and includes the routing logic 309 of the embodiments. Therefore, when the programming device 311 is connected to the laptop computer 400, the USB logic 303 detects that a USB device has been connected. However, the programming device 311 may send a data packet which is received by the routing logic 309. The routing logic 309 will then place the laptop computer into a programming mode, such that further data from the programming device 311 is routed to the appropriate location such as to the boot ROM 321. Among other advantages, the laptop computer 400 need not be disassembled in order to access the boot ROM for programming. The embodiments are therefore applicable to any device requiring boot code or BIOS upgrades wherein access to the boot ROM would require access to the internal circuit boards.

Figure 5:
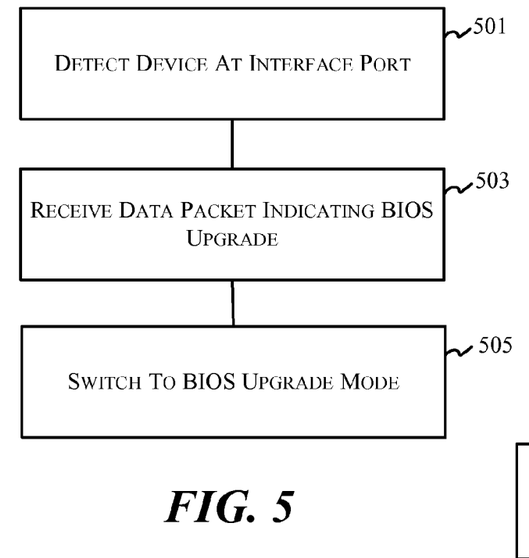
FIG. 5 is a flow chart of an electronic device operation in accordance with an embodiment.
Figure 6:
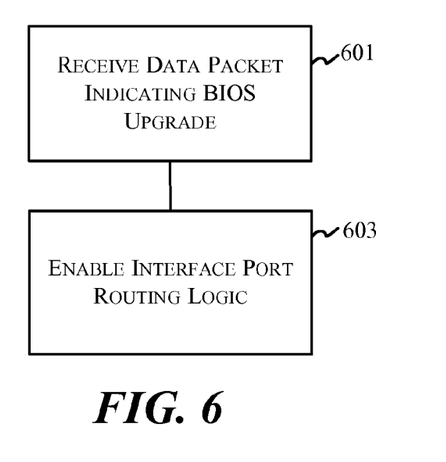
FIG. 6 is a flow chart for an electronic device switching into a BIOS upgrade mode in accordance with an embodiment.
Figure 7:
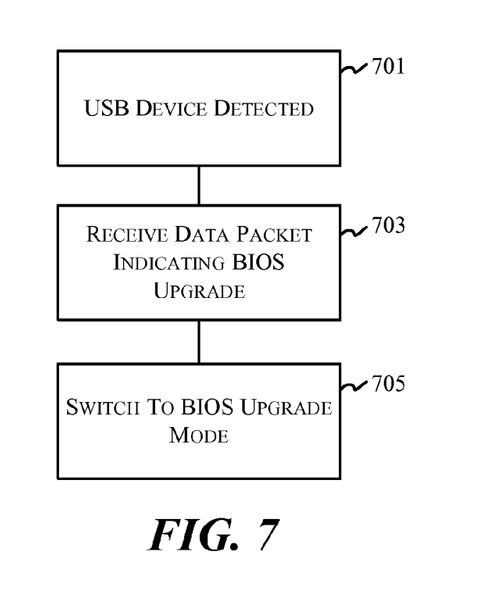
FIG. 7 is a flow chart for an electronic device using a USB port in accordance with an embodiment.

FIGS. 5, 6 and 7 provide further details of operation in accordance with the embodiments. As shown in FIG. 5, 501, a device, which may be the programming device 311, is detected at the connector 305, which, as discussed, may be a USB connector, mini-USB connector, IEEE 1394 connector, etc. The device detection in this embodiment is performed by the USB logic 303. The programming device 311 sends a data packet indicating that a BIOS upgrade will be performed. In response to the data packet, the routing logic 309 will configure the USB lines of the electronic device into a BIOS upgrade mode. This may include, among other actions, asserting a CPU reset of CPU 317. As shown in FIG. 6, the data packet, received via the USB interface, in 601 may enable the routing logic 309 as shown in 603.

FIG. 7 illustrates that, specific to embodiments utilizing a USB interface, the USB logic 303 will, in 701, detect a USB device when the programming device 311 is connected to USB connector 305. However, a data packet indicating a BIOS upgrade will then be sent from the programming device 311 to the routing logic 309, as shown in 703. In response, the routing logic 309 will cause the electronic device, such as laptop computer 400, to be placed into a BIOS upgrade mode, such that data from the programming device 311 will be routed to the memory subsystem 319, and thus to the boot ROM 321, or, in some embodiments, directly to the boot ROM 321. The programming device 311 may then perform a flash operation on the boot ROM 321 thereby upgrading or completely replacing the BIOS.

Therefore memory devices and methods of operation have been disclosed herein wherein a BIOS may be upgraded using a programming device that may be connected to the boot ROM, using a standardized interface such as, but not limited to, USB, IEEE 1394, etc., such that the boot ROM may be flashed with a new or revised BIOS, without the need for in-situ programming devices that access the circuit board directly. The embodiments include a routing logic such that the interface, such as USB, may be used to provide a data pathway from a programming device to a boot ROM and thereby reprogram the boot ROM.

Other variations that would be equivalent to the herein disclosed embodiments may occur to those of ordinary skill in the art and would remain in accordance with the spirit and scope of embodiments as defined herein by the following claims.

What is claimed is:

1. An electronic host device comprising:
   a processor;
   a memory subsystem storing a boot code, said processor operative to boot with said boot code; and
   routing logic in the electronic host device, operatively coupled to said memory subsystem and at least one communication port of said electronic host device, said communication port being accessible externally from said electronic host device, said communication port providing access to an internal bus of said electronic host device,
   wherein said routing logic is operative to route boot code upgrade data, from a peripheral stand-alone device that is external to said electronic host device, to said memory subsystem to bypass said processor in response to said peripheral stand-alone device transmitting a data packet to the electronic host device indicating that a boot code upgrade will be performed when connected at said at least one communication port, said boot code upgrade data for modifying or replacing said boot code stored within said memory subsystem.

2. The electronic host device of claim 1, wherein said boot code is a Basic Input/Output System (BIOS) code.

3. The electronic host device of claim 1, wherein said routing logic is further operable to receive said data packet from said peripheral stand-alone device, said data packet indicating that said peripheral stand-alone device is a PROM (programmable read only memory) programming device, and in response to receiving said data packet, obtain exclusive control of said internal bus to enable programming commands to flow from said peripheral stand-alone device to said memory subsystem, said memory subsystem including a PROM.

4. The electronic host device of claim 1, wherein said at least one communication port is a Universal Serial Bus (USB) port, wherein said internal bus includes a routing pathway from said USB port to said memory subsystem, and wherein said memory subsystem includes a flash type PROM.

5. An integrated circuit comprising the routing logic of claim 1.

6. The electronic host device of claim 1, having said peripheral stand-alone device connected at said at least one communication port, wherein said peripheral stand-alone device is operable to indicate to said routing logic that said peripheral stand-alone device is a PROM programming device.

7. The electronic host device of claim 1, wherein said peripheral stand-alone device is a USB device.

8. The electronic host device of claim 1, wherein said communication port is a USB port.

9. A host device comprising:
   an interface module having a communication port for communicating with a peripheral stand-alone device attached to said communication port;
   a memory interface module for communicating with a memory subsystem of the host device including a boot Programmable Read Only Memory (PROM); and
   a routing logic coupled to said interface module and said memory interface module, said routing logic operative to route boot code upgrade data, from said peripheral stand-alone device that is external to said host device, to said boot PROM to bypass a processor of said host device in response to said peripheral stand-alone device transmitting a data packet to the electronic host device indicating that a boot code upgrade will be performed when connected at said communication port, said processor operative to boot from said boot PROM, said boot code upgrade data for modifying a boot code stored on said boot PROM.

10. The memory interface device of claim 9, wherein said boot code is a Basic Input/Output System (BIOS) code.

11. The memory interface device of claim 9, wherein said routing logic is further operable to receive said data packet from said peripheral stand-alone device, said data packet indicating that said peripheral stand-alone device is a PROM programming device, and in response to receiving said data packet, obtain control of an internal bus between said memory interface module and said memory subsystem, to enable programming commands to flow from said peripheral stand-alone device to said memory subsystem, said memory subsystem including said PROM.

12. The memory interface device of claim 11, wherein said communication port is a USB port, wherein said internal bus includes a routing pathway from said USB port to said memory subsystem, and wherein said PROM is a flash type PROM.

13. An integrated circuit comprising the memory interface device of claim 9.

14. A method comprising:
  detecting a device at an interface port of an electronic host device;
  detecting, by a routing logic, that a peripheral stand-alone device, connected at a communication port of said electronic host device, is a PROM (programmable read only memory) programming device, wherein said peripheral stand-alone device is external to said electronic host device; and
  routing boot code upgrade data, from said peripheral stand-alone device to a memory subsystem of said electronic host device to bypass a processor of said electronic host device in response to said peripheral stand-alone device transmitting a data packet to the electronic host device indicating that a boot code upgrade will be performed when connected, said boot code upgrade data for modifying or replacing said boot code stored within said memory subsystem, said processor operative to boot from said boot code.

15. The method of claim 14, wherein routing boot code upgrade data from said peripheral stand-alone device, to a memory subsystem of said electronic host device, said boot code upgrade data comprises: modifying or replacing said boot code wherein said boot code is a Basic Input/Output System (BIOS) code.

16. The method of claim 14, comprising: receiving said data packet, by said routing logic, from said peripheral stand-alone device, said data packet indicating that said peripheral stand-alone device is a PROM programming device; and obtaining, in response to receiving said data packet, exclusive control of an internal bus to enable programming commands to flow from said peripheral stand-alone device to said memory subsystem, said memory subsystem including a PROM.

17. The method of claim 14, wherein detecting, by a routing logic, that a peripheral stand-alone device, connected at a communication port of an electronic host device, is a PROM (programmable read only memory) programming device, further comprises: detecting said peripheral stand-alone device at a USB port wherein said communication port is said USB port.

18. The method of claim 17, wherein routing said boot code upgrade data from said peripheral stand-alone device, to a memory subsystem of said electronic host device further comprises: routing said boot code upgrade data, by said routing logic, from said peripheral stand-alone device via said USB port and an internal bus that includes a routing pathway from said USB port to said memory subsystem, and wherein said memory subsystem includes a flash type PROM.

19. A non-transitory computer readable memory comprising:
  executable instructions for execution by at least one processor, that when executed cause said at least one processor to:
    detect a device at an interface port of an electronic host device including a processor;
    detect that a peripheral stand-alone device, connected at a communication port of said electronic host device including said at least one processor, is a PROM (programmable read only memory) programming device, wherein said peripheral stand-alone device is external to said electronic host device; and
    route boot code upgrade data, from said peripheral stand-alone device to a memory subsystem of said electronic host device, to bypass said processor of said electronic host device in response to said peripheral stand-alone device transmitting a data packet to the electronic host device indicating that a boot code upgrade will be performed, said boot code upgrade data for modifying or replacing said boot code stored within said memory subsystem, said processor operative to boot with said boot code.

20. The computer readable memory of claim 19, wherein said executable instructions, when executed further cause the one or more processors to: modify or replace said boot code wherein said boot code is a Basic Input/Output System (BIOS) code.

21. The computer readable memory of claim 19, wherein said executable instructions, when executed further cause the one or more processors to: receive said data packet from said peripheral stand-alone device, said data packet indicating that said peripheral stand-alone device is a PROM programming device; and obtain, in response to receiving said data packet, exclusive control of an internal bus to enable programming commands to flow from said peripheral stand-alone device to said memory subsystem, said memory subsystem including a PROM.

22. The computer readable memory of claim 19, wherein said executable instructions, when executed further cause the one or more processors to:
  detect said peripheral stand-alone device at a USB (universal serial bus) port wherein said communication port is said USB port.

23. The computer readable memory of claim 22, wherein said executable instructions, when executed further cause the one or more processors to:
  route said boot code upgrade data from said peripheral stand-alone device via said USB port and an internal bus that includes a routing pathway from said USB port to said memory subsystem, and wherein said memory subsystem includes a flash type PROM.

* * * * *